US010889195B2

(12) United States Patent
Tsuruta

(10) Patent No.: US 10,889,195 B2
(45) Date of Patent: Jan. 12, 2021

(54) VOLTAGE CONVERSION DEVICE, VEHICLE USING VOLTAGE CONVERSION DEVICE, AND CONTROL METHOD FOR VOLTAGE CONVERSION DEVICE

(71) Applicant: TOYOTA JIDOSHA KABUSHIKI KAISHA, Toyota (JP)

(72) Inventor: Yoshiaki Tsuruta, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 48 days.

(21) Appl. No.: 16/292,583

(22) Filed: Mar. 5, 2019

(65) Prior Publication Data

US 2019/0291598 A1 Sep. 26, 2019

(30) Foreign Application Priority Data

Mar. 26, 2018 (JP) ................................ 2018-057782

(51) Int. Cl.
*B60L 53/20* (2019.01)
*B60L 58/40* (2019.01)
*H02P 27/06* (2006.01)

(52) U.S. Cl.
CPC ............... *B60L 53/20* (2019.02); *B60L 58/40* (2019.02); *H02P 27/06* (2013.01)

(58) Field of Classification Search
CPC ................................ B60L 53/20; B60L 53/22
See application file for complete search history.

(56) References Cited

U.S. PATENT DOCUMENTS

| | | | | |
|---|---|---|---|---|
| 9,643,501 | B2 * | 5/2017 | Yamazaki | H01M 4/13 |
| 9,994,109 | B2 * | 6/2018 | Taguchi | B60L 58/26 |
| 2016/0152150 | A1 | 6/2016 | Taguchi et al. | |

FOREIGN PATENT DOCUMENTS

| | | | |
|---|---|---|---|
| JP | 2011-087406 | A | 4/2011 |
| JP | 2016-111730 | A | 6/2016 |

* cited by examiner

*Primary Examiner* — Hai L Nguyen
(74) *Attorney, Agent, or Firm* — Dickinson Wright PLLC

(57) ABSTRACT

An amount of electric power generated by a power supply device is input, an upper-limit current value is calculated using a relationship which varies with operation of the conversion circuit, a lower-limit voltage of the conversion circuit is calculated based on the amount of generated electric power and the upper-limit current value, and control is performed such that a voltage on an output side of the conversion circuit is higher than the lower-limit voltage. Accordingly, even when a voltage conversion device restricts a current output from the conversion circuit, it is possible to curb an influence on an output of the power supply device.

9 Claims, 7 Drawing Sheets

VOLTAGE CONVERSION DEVICE, VEHICLE USING VOLTAGE CONVERSION DEVICE, AND CONTROL METHOD FOR VOLTAGE CONVERSION DEVICE

INCORPORATION BY REFERENCE

The disclosure of Japanese Patent Application No. 2018-057782 filed on Mar. 26, 2018 including the specification, drawings and abstract is incorporated herein by reference in its entirety.

BACKGROUND

1. Technical Field

The disclosure relates to a voltage conversion device, a vehicle using the voltage conversion device, and control method for the voltage conversion device.

2. Description of Related Art

A voltage conversion device that steps up a voltage may be used for circuits of a power system. For example, in a fuel-cell vehicle, electric power generated by a fuel cell is stepped up by a boost converter included in a voltage conversion device and is supplied to a load such as a driving motor. This is because an amount of current required for supplying the same electric power can be decreased, a loss can be decreased, and other advantages can be achieved by increasing a voltage. For example, a loss may be caused due to resistance of a wire such as a bus bar, ON-resistance of a switching element, and the like. This loss increases in proportion to a square of an amount of current, and thus increases in a circuit using a large current such as a power system. Accordingly, an amount of current required for the same electric power is decreased by increasing a voltage using a voltage conversion device.

In such a voltage conversion device, when circuit constituent components of a circuit, for example, a switching element, a resistor, a wire such as a bus bar, and a power on/off relay, become a high temperature, such components are likely to malfunction due to emission of heat based on a loss. Accordingly, as described in Japanese Unexamined Patent Application Publication No. 2011-87406 (JP 2011-87406 A), in a voltage conversion device including a step-up circuit, a temperature of a coolant for cooling the voltage conversion device is detected and an output of a fuel cell that supplies electric power to the voltage conversion device is restricted when the temperature of the coolant increases.

SUMMARY

The technique described in JP 2011-87406 A is not limited to a configuration using a fuel cell and restricts a maximum current which is supplied from a power supply within a time range in which operation of a motor is not hindered based on the coolant temperature in a circuit configuration of a power converter. Since the voltage conversion device basically converts a voltage to enhance efficiency, there is always demand for as much of a decrease in loss as possible accompanied with the conversion.

A voltage conversion device according to the disclosure can be embodied in the following aspects.

A first aspect provides a voltage conversion device. The voltage conversion device is connected to a power supply device and is configured to increase a voltage input from the power supply device. The voltage conversion device includes: a conversion circuit configured to convert the voltage from the power supply device; an input unit configured to input an amount of electric power generated by the power supply device; and a control unit configured to control the conversion circuit. The control unit includes an upper-limit current calculating unit configured to calculate an upper-limit current value using a relationship which is determined based on an increase in temperature of the conversion circuit due to operation of the conversion circuit and a lower-limit voltage control unit configured to calculate a lower-limit voltage of the conversion circuit based on the amount of electric power generated by the power supply device and the upper-limit current value and to perform control such that a voltage on an output side of the conversion circuit is higher than the lower-limit voltage. The upper-limit current value is an upper limit value of a current which is able to be output from the conversion circuit. In the voltage conversion device, the upper-limit current value which is an upper limit of a current which is able to be output from the conversion circuit is calculated using a relationship which is determined based on an increase in temperature of the conversion circuit due to operation of the conversion circuit, the lower-limit voltage of the conversion circuit is calculated from the amount of electric power generated by the power supply device and the upper-limit current value, and control is performed such that the voltage on the output side of the conversion circuit is higher than the lower-limit voltage. Accordingly, it is possible to prevent occurrence of a situation in which an excessive current is output and thus deterioration of the conversion circuit is advanced when the temperature of the conversion circuit is high.

In the voltage conversion device according to the first aspect, the upper-limit current calculating unit may be configured to store the relationship as a relationship in which the upper-limit current value when the temperature of the conversion circuit is a first temperature which is higher than the upper-limit current value when the temperature of the conversion circuit is a second temperature higher than the first temperature. According to this configuration, it is possible to easily realize a relationship in which the upper-limit current value decreases as the temperature of the conversion circuit increases.

In the voltage conversion device according to the first aspect, the upper-limit current calculating unit may be configured to correlate the increase in temperature of the conversion circuit with a temperature time based on an elapsed time after the conversion circuit has started its operation and to store the relationship as a relationship in which the upper-limit current value decreases gradually with an increase in the temperature time. According to this configuration, since the temperature of the conversion circuit has a tendency to increase in proportion to the elapsed time after use thereof is started, it is possible to easily realize a relationship in which the upper-limit current value decreases as the temperature of the conversion circuit increases.

In the voltage conversion device according to the first aspect, the upper-limit current calculating unit may be configured to convert the elapsed time into the temperature time at a greater ratio when a loss of the conversion circuit after the conversion circuit has started its operation has a first magnitude than when the loss has a second magnitude less than the first magnitude. According to this configuration, since the increase in temperature of the conversion circuit is based on a loss in the conversion circuit, it is possible to more accurately correlate the temperature time with the increase in temperature of the conversion circuit.

In the voltage conversion device according to the first aspect, the upper-limit current calculating unit may be configured to set an initial value of the upper-limit current value depending on a state of the conversion circuit at a time of restarting its operation when the conversion circuit having temporarily stopped its operation restarts its operation. According to this configuration, when the conversion circuit restarts its operation, the upper-limit current value can be set depending on the state of the conversion circuit. Accordingly, even when the conversion circuit having stopped its operation for a short time restarts its operation and thus the temperature thereof does not decrease sufficiently, it is possible to cause the upper-limit current value to get closer to a proper value.

The voltage conversion device according to the first aspect may further include: a time detecting unit configured to calculate a post-stop elapsed time after the conversion circuit has stopped its operation; and an outside air temperature detecting unit configured to detect an outside air temperature outside the conversion circuit. The upper-limit current calculating unit may be configured to calculate the temperature of the conversion circuit when the conversion circuit having temporarily stopped its operation restarts its operation based on the post-stop elapsed time detected by the time detecting unit, the increase in temperature of the conversion circuit until its operation has been stopped, and the outside air temperature detected by the outside air temperature detecting unit and to calculate the upper-limit current value when the conversion circuit restarts its operation. According to this configuration, it is possible to cause the upper-limit current value when the conversion circuit restarts its operation to get closer to a proper value with a simple structure based on the time.

In the voltage conversion device according to the first aspect, the input unit may be configured to input a voltage output from the power supply device and a current value output from the power supply device as the amount of generated electric power. According to this configuration, it is possible to easily calculate an amount of electric power generated by the power supply device.

A second aspect provides a vehicle. The vehicle includes: a power supply device that is selected from a battery, a fuel cell, and a power generator; the above-mentioned voltage conversion device; and a load that operates using a voltage converted by the voltage conversion device. In such a vehicle, the load operates by generation of electric power in the power supply device. Examples of such a load include a driving motor and an auxiliary machine motor of a vehicle. It is possible to appropriately limit an upper limit of a current which flows into the load.

A third aspect provides a control method for a voltage conversion device including a conversion circuit that steps up a voltage input from a power supply device. The control method includes: inputting an amount of electric power generated by the power supply device; calculating an upper-limit current value using a relationship which varies with operation of the conversion circuit, the upper-limit current value being an upper-limit value of a current which is able to be output from the conversion circuit; calculating a lower-limit voltage of the conversion circuit based on the amount of electric power generated by the power supply device and the upper-limit current value; and performing control such that a voltage on an output side of the conversion circuit is higher than the lower-limit voltage.

The disclosure may be additionally embodied as various aspects such as a control method for a voltage conversion device, a method of manufacturing a voltage conversion device, a configuration of a moving object using a voltage conversion device, a method of manufacturing a moving object, and a current limiting method in a voltage conversion device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hardware Configuration of Embodiments

Figure 1:
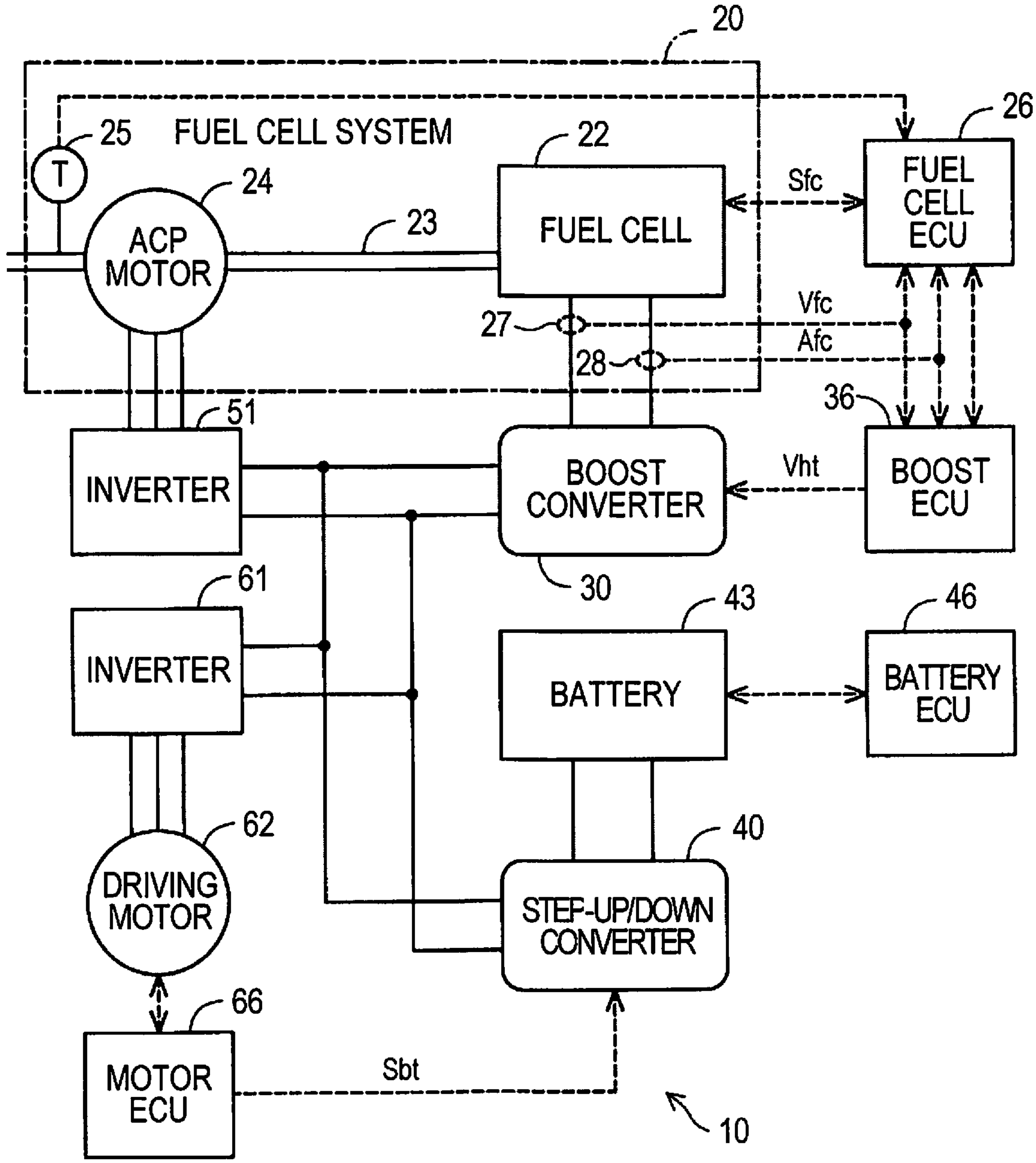
FIG. 1 is a diagram schematically illustrating a hardware configuration in embodiments.

A hardware configuration in some embodiments will be described below. As illustrated in FIG. 1, a fuel-cell vehicle (hereinafter simply referred to as a vehicle) 10 including a voltage conversion device according to embodiments includes a fuel cell system 20 serving as a power supply device and drives an electric motor which is provided in the vehicle 10 using electric power generated by the fuel cell system 20. Examples of such an electric motor include a driving motor 62 that generates a driving force for the vehicle 10 and an auxiliary machine such as an air compressor motor (hereinafter referred to as an ACP motor) 24. In the following embodiment, the driving motor 62 corresponds to a load.

The fuel cell system 20 includes various constituent elements such as a fuel cell 22, an intake and exhaust system that supplies hydrogen serving as a fuel gas, air as an oxidant gas, and the like to the fuel cell 22, and a coolant circulation system that cools the fuel cell 22. Since such elements for activating the fuel cell 22 are known, most thereof are not illustrated in FIG. 1, and only an ACP motor 24 that supplies air to the fuel cell 22 via an air supply pipe 23 and an intake air temperature sensor 25 that reads an intake air temperature THa are illustrated.

The fuel cell system 20 is controlled by a fuel cell electronic control unit (ECU) 26. The fuel cell ECU 26 is connected to sensors that detect the state of the fuel cell system 20, for example, the above-mentioned intake air temperature sensor 25 that detects an outside air temperature THa, a voltage sensor 27 that measures and outputs an output voltage Vfc of the fuel cell 22, and a current sensor 28 that measures and outputs an output current Afc. The fuel cell ECU 26 receives a variety of information from the fuel cell system 20, outputs a control signal Sfc to the fuel cell system 20, and controls an amount of fuel gas supplied, an amount of air supplied, a pressure of the air, and the like.

The vehicle 10 includes a boost converter 30 serving as a conversion circuit that is connected to a power supply line from the fuel cell 22 and a step-up/down converter 40 that is connected to a power supply line on the output side of the boost converter 30. The boost converter 30 is a converter that steps up the output voltage Vfc of the fuel cell 22 by about two times. Stepping-up of the output voltage of the fuel cell 22 by about two times using the boost converter 30 is performed in order to decrease an amount of current when the driving motor 62 connected to the output side of the boost converter 30 via the inverter 61 is driven. In general, since a loss in a wire (including a bus bar) is proportional to the square of a current, it is possible to enhance efficiency of the whole system by decreasing the amount of current. The inverter 51 that drives the ACP motor 24 is also connected to the output side of the boost converter 30. The ACP motor 24 or the driving motor 62 are permanent-magnet-type three-phase motors in this embodiment and are driven with three-phase alternating currents which are converted by the inverters 51 and 61.

The operation of the boost converter 30 is controlled by a boost ECU 36. The boost ECU 36 reads the power-generation voltage Vfc or the output current value Afc from the voltage sensor 27 and the current sensor 28 and calculates an upper-limit current value Aup which will be described later or transmits an instruction of a target voltage Vht for the output to the boost converter 30. The product of the power-generation voltage Vfc input from the voltage sensor 27 and the output current value Afc input from the current sensor 28 corresponds to the amount of electric power generated by the fuel cell 22. This information may be directly read from the sensors, be collected by the fuel cell ECU 26, and be received from the fuel cell ECU 26 using an onboard LAN or the like. In this case, the information may be received as an amount of generated electric power Wfc. The boost converter 30 that steps up the voltage output from the fuel cell 22 corresponds to a conversion circuit, and the boost ECU 36 that receives signals from the voltage sensor 27 and the current sensor 28 and controls the boost converter 30 corresponds to an input unit and a control unit. An upper-limit current calculating unit, a lower-limit voltage control unit, a time detecting unit, and the like are embodied by causing the boost ECU 36 to perform processes which will be described later. Accordingly, the configuration including the boost converter 30 and the boost ECU 36 corresponds to a voltage conversion device.

The step-up/down converter 40 performs mutual conversion of a voltage and exchange of electric power between the output side of the boost converter 30 and the battery 43. Before the fuel cell 22 starts power generation, the step-up/down converter 40 steps up electric power charged in the battery 43, operates auxiliary machines such as the ACP motor 24, and starts the fuel cell system 20. Alternatively, when the fuel cell 22 cannot generate sufficient electric power, such as before warming-up of the fuel cell 22 is completed, the step-up/down converter 40 steps up electric power of the battery 43, drives the driving motor 62 via the inverter 61, and causes the vehicle to travel. On the other hand, when the vehicle 10 performs a braking operation, the step-up/down converter 40 steps down electric power regenerated by the driving motor 62 and charges the battery 43. The driving motor 62 is controlled by a motor ECU 66, and the motor ECU 66 outputs a control signal Sbt to the step-up/down converter 40 depending on whether the driving motor 62 is in a powering state or in a regenerative state and instructs stepping-up/down processing, an output voltage thereof, and the like. In addition, a charging state of the battery 43, for example, a state of charge (SOC), is detected by a battery ECU 46.

B. Control in First Embodiment

Figure 2:
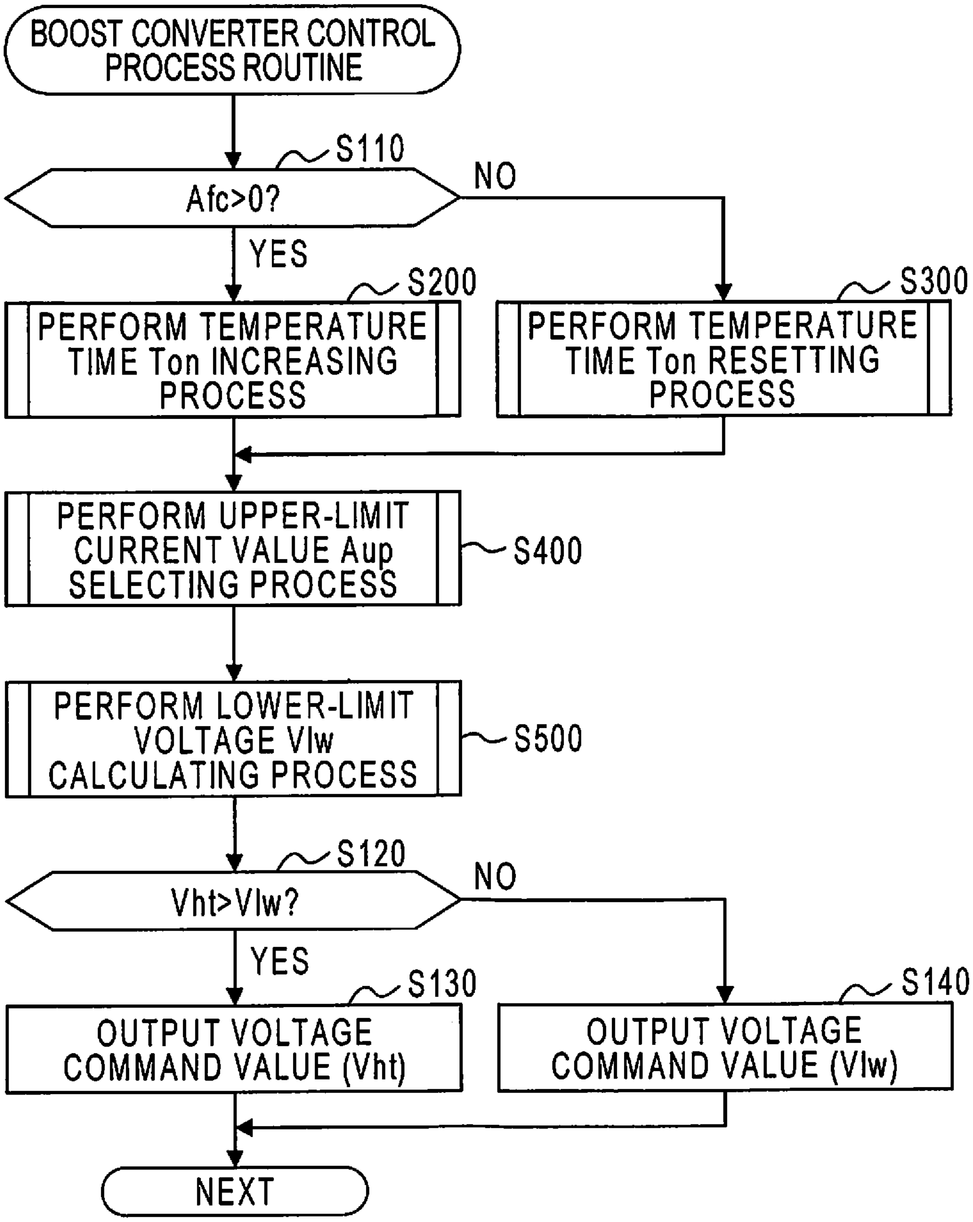
FIG. 2 is a flowchart illustrating a boost converter control process routine according to a first embodiment.

A boost converter control process according to a first embodiment will be described below. A boost converter control process routine illustrated in FIG. 2 is repeatedly performed at predetermined intervals after the fuel cell system 20 has started and the fuel cell 22 has started power generation at rated electric power. This process routine is a routine that is performed by the boost ECU 36. Along with this process routine, the fuel cell ECU 26 controls the operation of the fuel cell system 20 and, particularly, the operation of the fuel cell 22. The motor ECU 66 controls or monitors the state of the step-up/down converter 40, and the battery ECU 46 controls or monitors the state of the battery 43.

When the routine illustrated in FIG. 2 is started, the boost ECU 36 first determines whether the output current value Afc of the fuel cell 22 read from the current sensor 28 is greater than 0 (Step S110). When the output current value Afc of the fuel cell 22 is greater than 0, it means that the fuel cell 22 is operating and outputting electric power. Therefore, the boost ECU 36 performs a process of increasing a temperature time Ton (Step S200) when the fuel cell 22 is operating and performs a process of resetting the temperature time Ton (Step S300) when the fuel cell 22 does not operate.

The temperature time Ton is a parameter reflecting an increase/decrease in temperature of the boost converter 30 as an elapsed time with attention paid to the fact that the boost converter 30 operates with supply of electric power generated by the fuel cell 22 and the internal temperature of the boost converter 30 increases with the operation and decreases when the boost converter 30 is not operating. When the temperature of the boost converter 30 increases, an upper-limit current value Aup which is able to be output from the boost converter 30 decreases in order to avoid deterioration of the boost converter 30. Calculation of the temperature time Ton is performed to calculate the upper-limit current value Aup. In the temperature time increasing process (Step S200) according to the first embodiment, the temperature time Ton simply increases gradually in real time from the start of operation of the boost converter 30. In the temperature time Ton resetting process (Step S300), the temperature time Ton is reset to 0 with the stop of operation of the boost converter 30.

Figure 3:
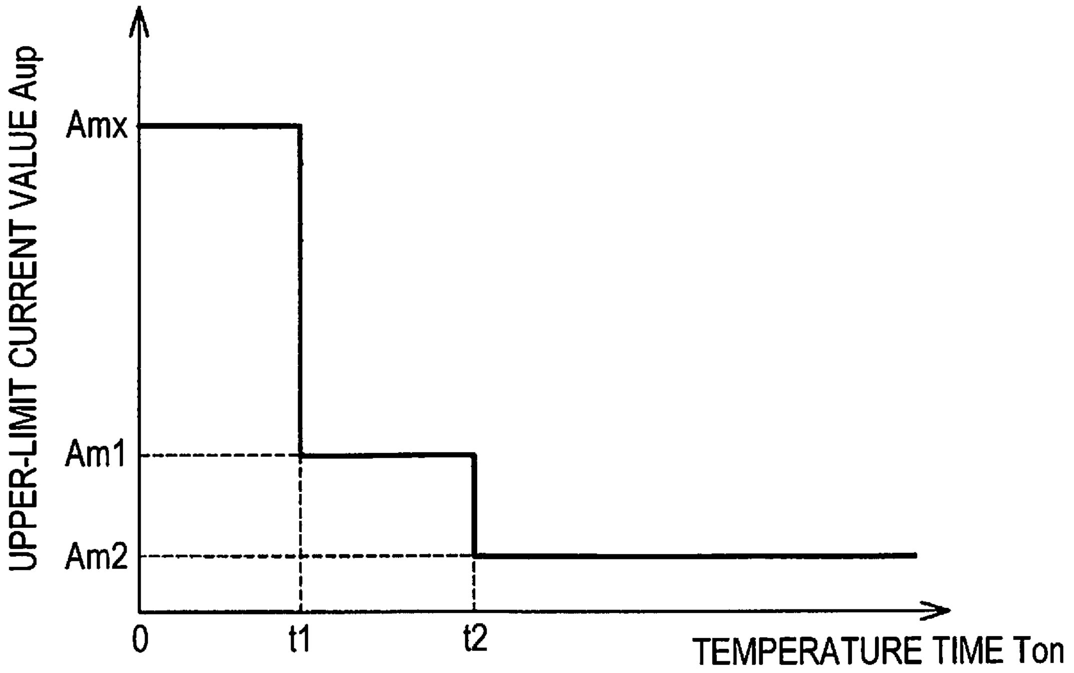
FIG. 3 is a graph illustrating an example of a relationship between a temperature time Ton and an upper-limit current value Aup.
Figure 4:
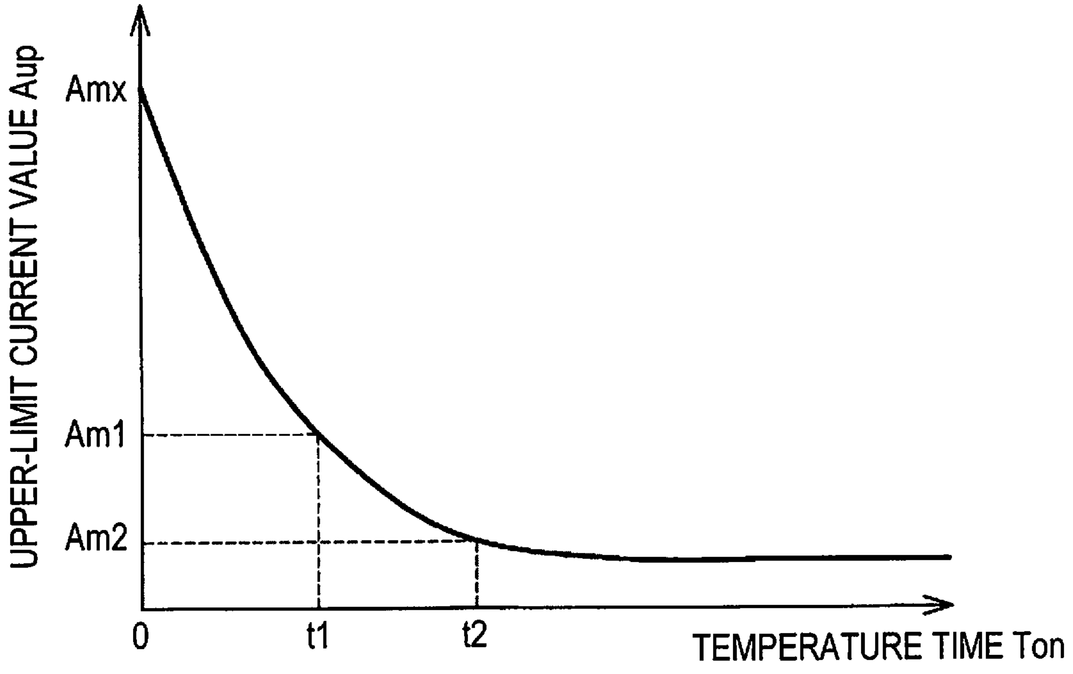
FIG. 4 is a graph illustrating another example of a relationship between a temperature time Ton and an upper-limit current value Aup.

After the temperature time Ton has been calculated, a process of selecting the upper-limit current value Aup is performed (Step S400). An example of a relationship for calculating the upper-limit current value Aup from the temperature time Ton is illustrated in FIG. 3. In this example, the upper-limit current value Aup has a value Amx until the temperature time Ton reaches time t1, has a value Am1 while the temperature time Ton ranges from time t1 to time t2, and has a value Am2 after the temperature time Ton reaches time t2. That is, the relationship illustrated in FIG. 3 is a relationship in which the upper-limit current value Aup when the temperature of the boost converter 30 is a first temperature is greater than the upper-limit current value Aup when the temperature of the boost converter 30 is a second temperature higher than the first temperature, and the boost ECU 36 stores this relationship in a memory built therein. In the first embodiment, since the temperature time Ton coincides with real time, the upper-limit current value Aup switches and decreases in three steps over time. The relationship between the temperature time Ton and the upper-limit current value Aup is not limited to the example illustrated in FIG. 3 and may be switched in more minute steps or may be defined, for example, as a relationship in which the upper-limit current value Aup decreases over time as illustrated in FIG. 4. This relationship may be defined as a relationship expressed by Equation (1).

$$\text{Upper-limit current value } Aup=Ami+(Amx-Ami)/(\text{Ton}+1) \quad (1)$$

Here, the value Amx is a maximum value of the upper-limit current value Aup, and the value Ami is a minimum value of the upper-limit current value Aup. The minimum value Ami of the upper-limit current value Aup is defined as an upper-limit current value when the temperature time Ton is equal to or greater than a predetermined time, heat emission and heat dissipation in the boost converter 30 are balanced, and the internal temperature thereof becomes constant.

After the upper-limit current value Aup has been selected in this way, a process of calculating a lower-limit voltage V1*w* is performed (Step S500). The lower-limit voltage V1*w* is a voltage with which a maximum current (that is, the upper-limit current value Aup) is able to be taken from electric power input to the boost converter 30, that is, electric power generated by the fuel cell 22. The lower-limit voltage V1*w* can be calculated by Equation (2).

$$V1w=\lambda\times Vfc\times Afc/Aup \quad (2)$$

The coefficient λ denotes conversion efficiency of the boost converter 30. When the conversion efficiency can be ignored, the calculation can be carried out with λ=1.

After the lower-limit voltage V1*w* has been calculated in this way, the boost ECU 36 determines whether the target voltage Vht which is instructed to the boost converter 30 is greater than the lower-limit voltage V1*w* (Step S120). The boost ECU 36 outputs the target voltage Vht as a voltage command value for the boost converter 30 (Step S130) when the target voltage Vht output from the boost converter 30 is greater than the lower-limit voltage V1*w* and outputs the lower-limit voltage V1*w* as a voltage command value for the boost converter 30 (Step S140) when the target voltage Vht is equal to or less than the lower-limit voltage V1*w*. As a result, the output voltage of the boost converter 30 is controlled such that it is equal to or greater than the lower-limit voltage V1*w*, and thus the current output from the boost converter 30 is not greater than the upper-limit current value Aup. After the voltage command value has been output (Step S130 or S140), this process routine transitions to "NEXT" and ends temporarily.

According to the above-mentioned first embodiment, the internal temperature of the boost converter 30 from the start of operation of the boost converter 30 is estimated as the temperature time Ton reflecting the elapsed time from the start of operation, the upper-limit current value Aup which is an upper limit of the current output from the boost converter 30 is calculated with reference to a predetermined relationship between the temperature time Ton and the upper-limit current value Aup, and the output voltage of the boost converter 30 is set to be equal to or greater than the lower-limit voltage V1*w* such that the upper-limit current value Aup is not exceeded. Accordingly, it is possible to prevent occurrence of a situation in which an excessive current is output and deterioration of the boost converter 30 is advanced when the internal temperature of the boost converter 30 is high. Since it is not necessary to measure the internal temperature of the boost converter 30, it is possible to achieve this advantage with a simple configuration. According to the first embodiment, the electric power to be generated required for the fuel cell 22 does not change due to change of the upper-limit current value Aup.

C. Control in Second Embodiment

Figure 5:
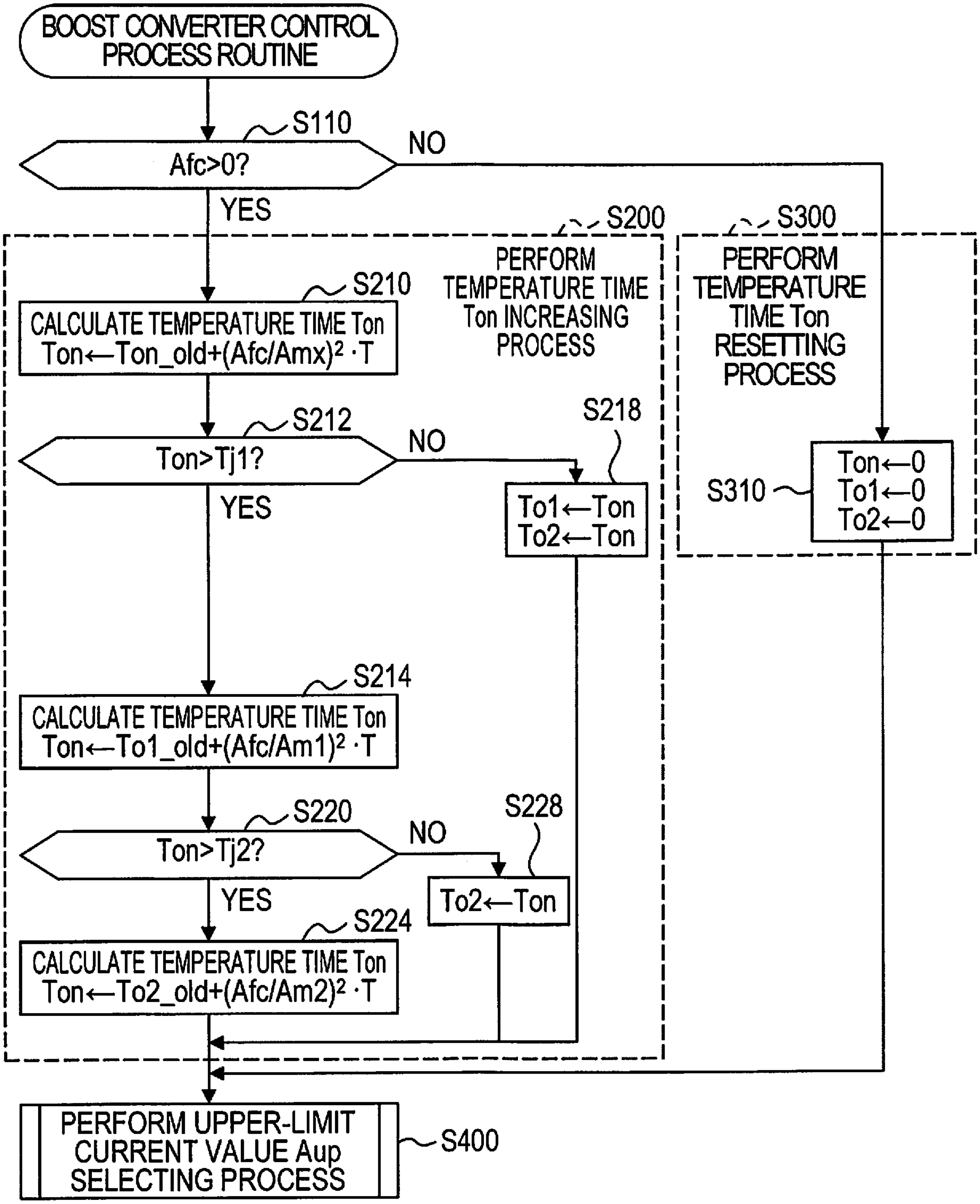
FIG. 5 is a flowchart illustrating a boost converter control process routine according to a second embodiment.

A second embodiment will be described below. A vehicle 10 according to the second embodiment has the same hardware configuration as in the first embodiment, in that the vehicle includes a boost converter 30 corresponding to a voltage conversion device and a fuel cell 22 corresponding to a power supply device. The second embodiment is different from the first embodiment in a process which is performed by the boost ECU 36. FIG. 5 is a flowchart illustrating principal parts of a boost converter control process routine which is performed by the boost ECU 36 in the second embodiment. In FIG. 5, processes from the start of the process routine to Step S400 in the first embodiment illustrated in FIG. 2 are illustrated. In the second embodiment, a temperature time Ton increasing process (Step S200) and a temperature time resetting process (Step S300) are different from those in the first embodiment.

In the second embodiment, the temperature time Ton increasing step (Step S200) is also performed when generation of electric power is performed by the fuel cell 22 (Afc>0). The temperature time resetting process (Step S300) is performed when generation of electric power is not performed by the fuel cell 22. In the temperature time resetting process (Step S300), parameters To1 and To2 which are used in Steps S200 along with the temperature time Ton are all reset to 0 (Step S310).

On the other hand, when generation of electric power is performed by the fuel cell 22 and the temperature time Ton increasing process (Step S200) is performed, first, a process of calculating the temperature time Ton is performed with respect to the actual elapsed time T using Equation (3) (Step S210).

$$\text{Ton}\leftarrow\text{Ton\_old}+(Afc/Amx)^2\cdot T \quad (3)$$

Here, suffix "_old" denotes a value when the process was previously performed, that is, a previous value. Accordingly, Ton_old is a previous value of the temperature time Ton which was calculated when the routine was previously performed. Afc is a power-generation current value of the fuel cell 22, and Amx is a maximum value of the upper-limit current value Aup illustrated in FIGS. 3 and 4. The loss of the boost converter 30 is proportional to the square of the current value. Accordingly, an amount of emitted heat is small when the current actually flowing into the boost converter 30 is small, and the amount of emitted heat becomes larger when the current becomes larger. Accordingly, the ratio at which the actual elapsed time T is reflected in the increase of the temperature time Ton is considered using a coefficient $(\text{Afc/Amx})^2$. In this example, as the current Afc flowing into the boost converter 30 gets closer to the maximum value Amx of the upper-limit current value Aup, the elapsed time is reflected in the temperature time Ton at a higher ratio. The temperature time Ton calculated by Equation (3) is used as a previous value Ton_old when Step S200 is performed next.

Then, the boost ECU 36 determines whether the calculated temperature time Ton is greater than a predetermined threshold time Tj1 (Step S212). The threshold time is a time corresponding to time t1 in FIG. 3 based on the first embodiment. When the temperature time Ton is not greater than the threshold time (NO in Step S212), the calculation parameters To1 and To2 are set to the temperature time Ton calculated by Equation (3) (Step S218), Step S200 ends temporarily, and Step S400, that is, the process of selecting the upper-limit current value Aup, is performed. At this time, the temperature time Ton is the value calculated by Equation (3), and the upper-limit current value Aup is calculated using the value, for example, based on the relationship illustrated in FIG. 3. In this case, the current value Aup is the maximum value Amx.

When this routine is repeated in several cycles and the temperature time Ton calculated in Step S210 is greater than the threshold time Tj1 ("YES" in Step S212), the temperature time Ton is calculated by Equation (4) in Step S214.

$$Ton \leftarrow To1\_old + (Afc/Am1)^2 \cdot T \quad (4)$$

After the temperature time Ton has been calculated by Equation (4), the calculated latest value of the temperature time Ton is set as the parameter To1 (To1←Ton). As a result, To1_old is a previous value of the parameter To1 set in Step S218 when Step S214 is first performed and is the same as the previous value of the temperature time Ton thereafter. Am1 is a value which is determined to be less than the maximum value Amx of the upper-limit current value Aup illustrated in FIGS. 3 and 4. In this case, as the current Afc flowing into the boost converter 30 gets closer to the value Am1 which is determined as one upper-limit current value Aup, the elapsed time is reflected in the temperature time Ton at a higher ratio.

After the temperature time Ton has been calculated in this way, the boost ECU 36 determines whether the calculated temperature time Ton is greater than a predetermined threshold time Tj2 (Step S220). The threshold time is a time corresponding to time t2 in FIG. 3 based on the first embodiment. When the temperature time Ton is not greater than the threshold time (NO in Step S220), the calculation parameter To2 is set to the temperature time Ton calculated by equation (4) (Step S228), Step S200 ends temporarily, and Step S400, that is, the process of selecting the upper-limit current value Aup, is performed. At this time, the temperature time Ton is the value calculated by Equation (4), and the upper-limit current value Aup is calculated using the value, for example, based on the relationship illustrated in FIG. 3. In this case, the current value Aup is a value Am1 less than the maximum value Amx.

When this routine is repeated in several cycles and the temperature time Ton increases, the determination results of Steps S212 and S220 are all "YES". In this case, the temperature time Ton is calculated by Equation (5) in Step S224.

$$Ton \leftarrow To2\_old + (Afc/Am2)^2 \cdot T \quad (5)$$

After the temperature time Ton has been calculated by Equation (5), the calculated latest value of the temperature time Ton is set as the parameter To2 (To2←Ton). As a result, To2 old is a previous value of the parameter To2 set in Step S228 when Step S224 is first performed and is the same as the previous value of the temperature time Ton thereafter. Am2 is a value which is determined to be the lowest value of the upper-limit current values Aup illustrated in FIGS. 3 and 4. In this case, as the current Afc flowing into the boost converter 30 gets closer to the value Am2 which is determined as one upper-limit current value Aup, the elapsed time is reflected in the temperature time Ton at a higher ratio. That is, the process of converting the elapsed time into the temperature time Ton at a higher ratio when the loss in the boost converter 30 after the boost converter 30 has started its operation has a first magnitude than when the loss in the boost converter 30 has a second magnitude less than the first magnitude is implemented through the processes of Steps S214 and S218.

After the temperature time Ton has been calculated in this way, Step S200 ends temporarily and Step S400, that is, the process of selecting the upper-limit current value Aup, is performed. At this time, the temperature time Ton is the value calculated by Equation (5), and the upper-limit current value Aup is calculated using the value, for example, based on the relationship illustrated in FIG. 3. In this case, the current value Aup becomes the smaller value Am2.

In the boost converter 30 according to the above-mentioned second embodiment, since the temperature time Ton is calculated using the ratio which is determined depending on the magnitude of the current flowing into the boost converter 30, it is possible to more accurately estimate the increase in temperature due to the operation of the boost converter 30 to calculate the upper-limit current value Aup and thus to set the lower-limit voltage V1*w* to a more proper value. Accordingly, it is possible to achieve an excellent advantage that excessive current limiting is not performed in addition to the operational advantage of the first embodiment.

D. Third Embodiment

A third embodiment will be described below. A vehicle 10 according to the third embodiment has the same configuration as in the first and second embodiments, but has a hardware configuration different from those of the first and second embodiments in the followings. In the third embodiment, the fuel cell ECU 26 outputs an intake air temperature (an outside air temperature) THa detected by the intake air temperature sensor 25 illustrated in FIG. 1 in response to a request from the boost ECU 36. The boost ECU 36 uses the intake air temperature THa received from the fuel cell ECU 26 as an outside air temperature THa. An independent outside air temperature sensor may be provided instead of the intake air temperature sensor 25 and the boost ECU 36 may directly read a signal thereof and measure the outside air temperature THa.

Figure 6:
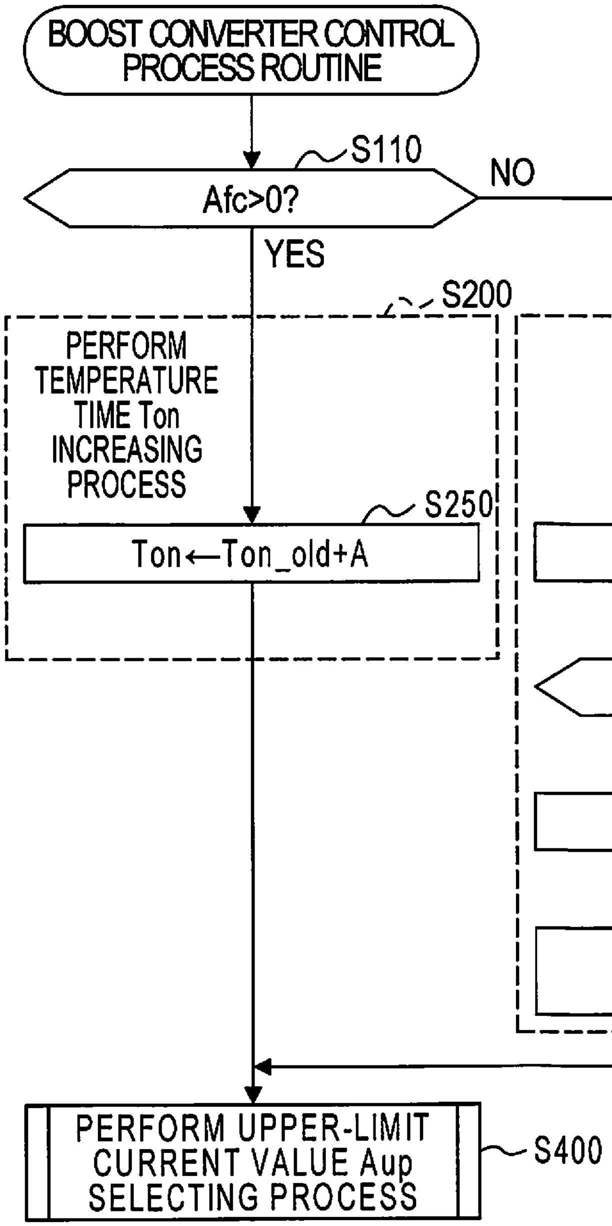
FIG. 6 is a flowchart illustrating a boost converter control process routine according to a third embodiment.

In consideration of the difference in the hardware configuration, the boost ECU 36 in the vehicle 10 according to the third embodiment performs a boost converter control process routine illustrated in FIG. 6 after having received the outside air temperature THa via the fuel cell ECU 26.

The boost ECU 36 in the third embodiment performs the boost converter control process routine illustrated in FIG. 6. The flowchart illustrated in FIG. 6 is principal part of the boost converter control process described in the first embodiment (FIG. 2). In FIG. 6, processes from the start of the process routine according to the first embodiment illustrated in FIG. 2 to Step S400 are illustrated. In the third embodiment, a temperature time Ton increasing process (Step S200) and a temperature time resetting process (Step S300) are different from those in the first and second embodiments.

In the third embodiment, the temperature time Ton increasing process (Step S200) is also performed when generation of electric power is being performed by the fuel cell 22 (Adc>0). The temperature time resetting process (Step S300) is performed when generation of electric power is not performed by the fuel cell 22.

In the temperature time Ton increasing process (Step S200) which is performed when generation of electric power is being performed by the fuel cell 22, a process of calculating the temperature time Ton using Equation (6) with respect to an actual elapsed time T (Step S250).

$$Ton \leftarrow Ton\_old + A \quad (6)$$

Here, A is a value that is used to reflect how the temperature of the boost converter 30 has increased at intervals at which the boost converter control process routine is performed. Similarly to the first embodiment, the value A may be set as a coefficient for simply gradually increasing the temperature time Ton, may be determined, for example, based on an amount of electric power (Vfc×Afc or the like) of which the voltage is converted by the boost converter 30 at that time or the loss generated in the boost converter 30, or may be determined based on the outside air temperature THa which is received from the fuel cell ECU 26 by the boost ECU 36. The value A may be determined based on both points or with reference to other parameters or the like.

On the other hand, when the fuel cell system 20 does not generate electric power ("NO" in Step S110), the following process is performed as the temperature time Ton resetting process (Step S300). First, a process of calculating a temperature reset time Tof corresponding to a post-stop elapsed time using Equation (7) is performed (Step S350).

$$Tof \leftarrow Tof\_old + B \quad (7)$$

Here, the temperature reset time Tof is a parameter which is used to estimate a temperature decreasing way of the boost converter 30 after the operation of the boost converter 30 has stopped. Since determination of whether the fuel cell 22 is performing generation of electric power and the process of resetting the temperature reset time Tof to 0 are performed again in Steps S352 and S354 subsequent to Step S350, it can be seen that the temperature reset time Tof is increased by a value B whenever the boost converter control process routine is performed at predetermined intervals while the fuel cell 22 stops generation of electric power and is reset to 0 at a time ("YES" in Step S352) at which the fuel cell 22 restarts generation of electric power in a state in which the generation of electric power is stopped ("NO" in Step S110). After the processes (Steps S350 to S354) have been performed, the temperature time Ton is calculated using Equation (8).

$$Ton \leftarrow Ton\_old - K \cdot Tof \quad (8)$$

Here, Ton is guarded such that the value thereof is not equal to or less than 0. Similarly, the temperature time Ton in the process of Step S252 is assumed to be a temperature which can be reached with a rated operation and is guarded with a predetermined upper-limit value. This process is not illustrated in the drawing.

Thereafter, when Step S200 ends, the process routine transitions to Step S400 and the process of calculating the upper-limit current value Aup is performed. When this process is performed, the temperature time Ton changes as follows. [1] When the fuel cell 22 starts its operation, the boost converter 30 starts a stepping-up operation and the internal temperature thereof increases depending on an amount of electric power of which the voltage is converted (stepped up herein). As a result, the temperature time Ton increases over time. Then, as illustrated in FIG. 3 or 4, the upper-limit current value Aup decreases gradually with an increase in the temperature time Ton and converges finally on a constant value. [2] When the fuel cell 22 stops its operation, the internal temperature of the boost converter 30 decreases gradually and thus the temperature reset time Tof increases. Therefore, while the fuel cell 22 stops its operation, the temperature time Ton decreases gradually at a ratio obtained by multiplying the temperature reset time Tof by a predetermined coefficient K as expressed by Equation (8). [3] Accordingly, when the fuel cell 22 restarts its operation next, the temperature time Ton cannot be said to be 0 and becomes a value in which the temperature is reflected when the internal temperature of the boost converter 30 decreases sufficiently, and the upper-limit current value Aup immediately after the boost converter 30 has restarted its operation reflects the internal temperature of the boost converter 30.

As a result, even when the fuel cell 22 restarts its operation in a short time after the fuel cell 22 has stopped its operation, the upper-limit current value Aup can be set to a value reflecting the internal temperature of the boost converter 30, the lower-limit voltage V1*w* of the boost converter 30 can be set to a proper value suitable therefor, and thus the boost converter 30 is not operated with an unreasonable amount of electric power. Accordingly, it is possible to further secure reliability of the boost converter 30.

Figure 7:
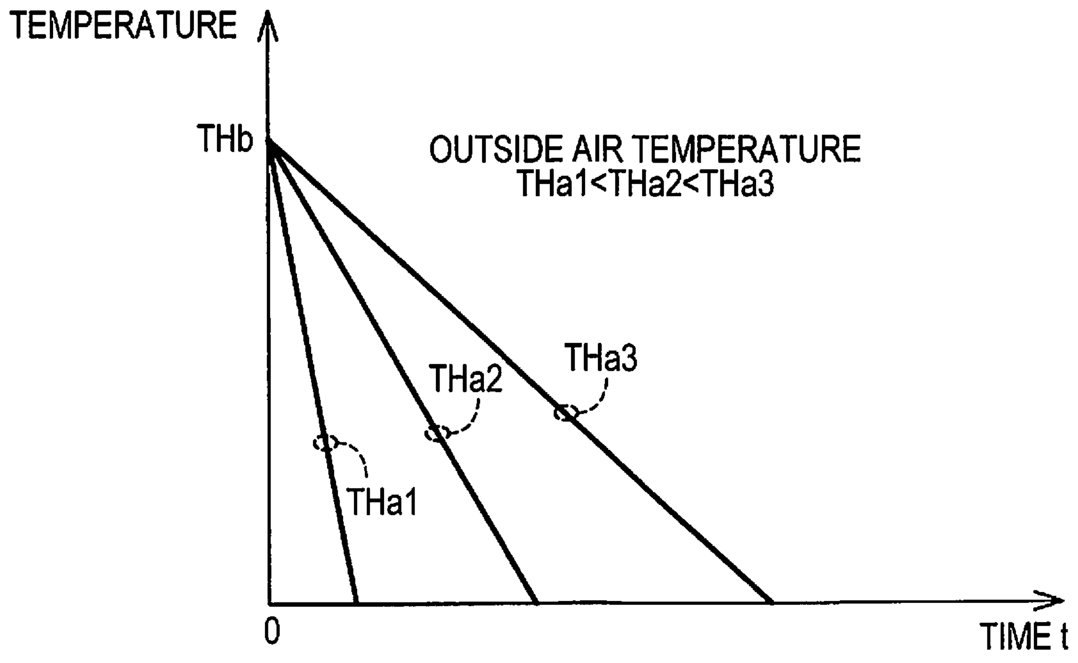
FIG. 7 is a diagram illustrating a decrease in temperature in a boost converter by linear approximation.
Figure 8:
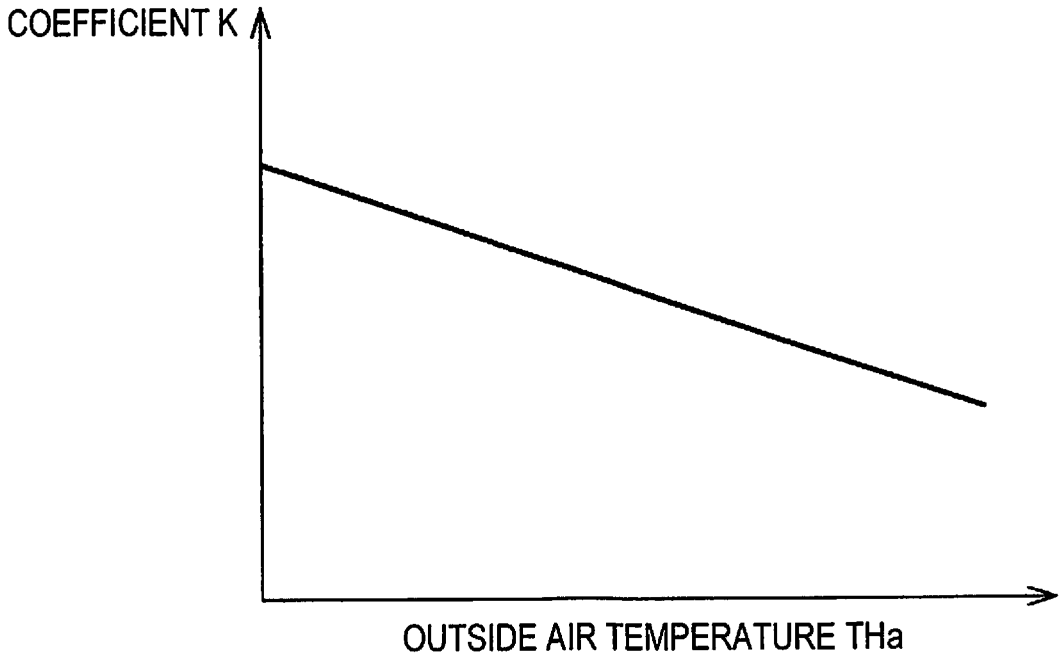
FIG. 8 is a diagram illustrating a relationship between an outside air temperature THa and a coefficient K.

In this case, the coefficient K may be set to a predetermined value but may be calculated as follows. The internal temperature of the boost converter 30 decreases over time from an end-point temperature THb when the operation of converting a voltage has stopped. FIG. 7 illustrates this decreasing state by linear approximation. Three straight lines illustrated in FIG. 7 denote states in which the outside air temperature THa is THa1, THa2, and THa3. At this time, the outside air temperatures have a relationship of THa1<THa2<THa3. That is, the internal temperature of the boost converter 30 decreases faster as the outside air temperature THa becomes lower. Therefore, the value of the coefficient K can be determined depending on the slope thereof. This relationship is illustrated in FIG. 8. The coefficient K is set to become smaller as the outside air temperature THa becomes higher. The temperature of the boost converter 30 can be calculated based on a constant system using a physical model when the specific heat, the mass, the surface area, and the amount of radiated heat of the boost converter 30 as a whole, the outside air temperature, the current temperature of the boost converter 30, and the like are known. Accordingly, a heat radiation model may be constructed and the temperature may be calculated using an approximate equation based on the heat radiation model which may be calculated in real time. Alternatively, a map may be prepared based on a heat radiation model and the temperature may be calculated based on the map.

Figure 9:
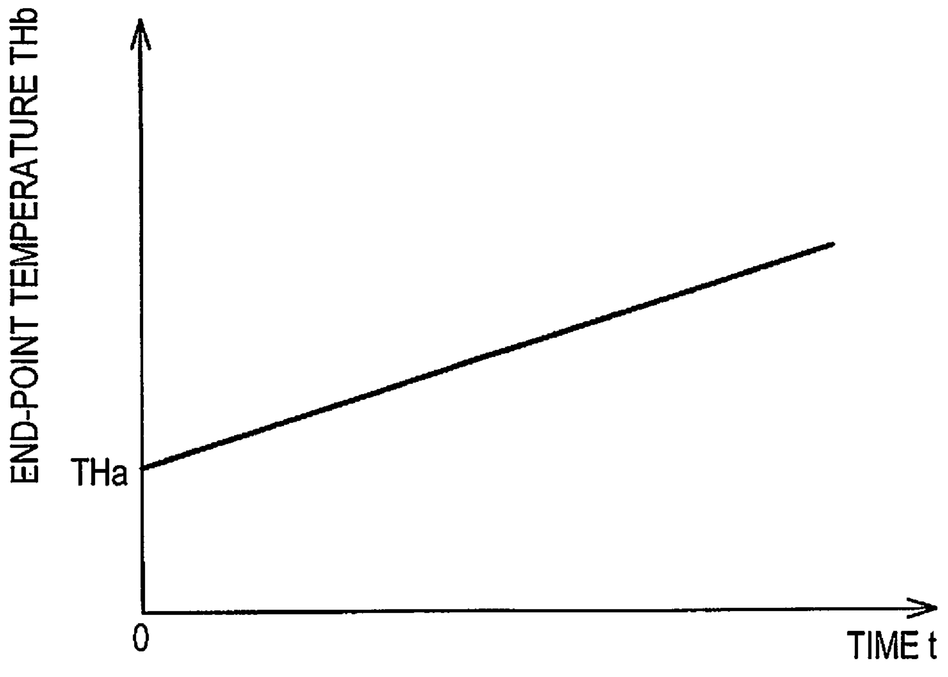
FIG. 9 is a diagram illustrating a relationship between a time t and an end-point temperature THb after an operation has been started.

There is a likelihood that the internal temperature of the boost converter 30 will reach a higher temperature as the outside air temperature THa when the boost converter 30 is operating is higher. Therefore, as illustrated in FIG. 9, the end-point temperature THb of the boost converter 30 while the fuel cell 22 is operating is assumed to increase over time t with the outside air temperature THa as an initial value and the ratio A at which the temperature time Ton increases in Step S252 may be determined.

E. Other Embodiments

In the above-mentioned embodiments, the internal temperature of the boost converter 30 is estimated and the upper-limit current value Aup is calculated, but the internal temperature of the boost converter 30 may be directly measured by a temperature sensor which is provided therein, the temperature time Ton may be calculated using the measured value, and the upper-limit current value Aup may be set.

In the embodiments, whether the boost converter 30 is operating is determined based on the power-generation current Afc of the fuel cell 22, but may be determined based on an operating current or the like in the boost converter 30. The boost converter 30 or the like may have a boost coil. Accordingly, in this case, the operating state may be determined based on a magnetic field which is generated in the coil.

The upper-limit current value Aup may be calculated with reference to a relationship between the upper-limit current value and the temperature time Ton which is stored in advance as map as illustrated in FIG. 3, or may be calculated based on Equation (1) or the like. Alternatively, the upper-limit current value Aup may be calculated directly from the internal temperature of the boost converter.

In the second and third embodiments, when the internal temperature of the boost converter 30 is likely to increase, the internal temperature is reflected in the temperature time Ton such that the temperature time Ton is increased. That is, it is conceivable that the relationship illustrated in FIG. 3 or 4 is fixed and the temperature time Ton on the horizontal axis can be extended or contracted. In this way, instead of reflecting the internal temperature of the boost converter 30 in the time, the relationship illustrated in FIG. 3 or 4 may be reflected. The relationship illustrated in FIG. 3 or 4 may be prepared for each internal temperature of the boost converter 30 and the relationships may be switched depending on the internal temperature of the boost converter 30.

In the above-mentioned embodiments, the boost converter 30 serving as a conversion circuit performs only stepping-up of a voltage, but a step-down converter or a step-up/down converter may be employed. A fuel cell is exemplified as the power supply device, but the power supply device is not limited to a fuel cell. The power supply device may be a battery, or may be an internal combustion engine or a power generator which is driven by wind power, wave power, or the like. Such a voltage conversion device may be applied to an electric vehicle, a fuel-cell vehicle, or a so-called hybrid vehicle or various moving objects such as a two-wheeled vehicle, a ship, and a subway. The voltage conversion device may be applied to a power supply device using a fuel cell which is originally stationary, or the like.

The load is a vehicle-traveling motor in the above-mentioned embodiments, but another motor may be employed. Only one driving motor is provided in the whole vehicle, but a configuration in which a driving motor is provided for each of front wheels and rear wheels, a configuration as a wheel motor, or the like may be employed. The load may be another type such as heater.

The disclosure is not limited to the above-mentioned embodiments and can be embodied in various forms without departing from the gist of the disclosure. For example, technical features of the embodiments corresponding to technical features of the aspects described in the SUMMARY can be appropriately exchanged or combined to solve a part or all of the above-mentioned problems or to achieve a part or all of the above-mentioned advantages. The technical features can be appropriately deleted as long as they are not described as being essential in this specification. For example, some elements which are embodied by hardware in the embodiments may be embodied by software. At least a part of elements which are embodied by software may be embodied by discrete circuit configurations.

What is claimed is:

1. A voltage conversion device that is connected to a power supply device and is configured to increase a voltage input from the power supply device, the voltage conversion device comprising:

- a conversion circuit configured to convert the voltage from the power supply device;
- an input unit configured to input an amount of electric power generated by the power supply device; and
- a control unit configured to receive the amount of electric power generated from the input unit and to control the conversion circuit, wherein the control unit includes

- an upper-limit current calculating circuit configured to calculate an upper-limit current value using a relationship which is determined based on an increase in temperature of the conversion circuit due to operation of the conversion circuit, the upper-limit current value being an upper limit value of a current which is able to be output from the conversion circuit, and
- a lower-limit voltage control circuit configured to calculate a lower-limit voltage of the conversion circuit based on the amount of electric power generated by the power supply device and the upper-limit current value and to perform control such that a voltage on an output side of the conversion circuit is higher than the lower-limit voltage.

2. The voltage conversion device according to claim 1, wherein the upper-limit current calculating circuit is configured to store the relationship as a relationship in which the upper-limit current value when the temperature of the conversion circuit is a first temperature which is higher than the upper-limit current value when the temperature of the conversion circuit is a second temperature higher than the first temperature.

3. The voltage conversion device according to claim 1, wherein the upper-limit current calculating circuit is configured to correlate the increase in temperature of the conversion circuit with a temperature time based on an elapsed time after the conversion circuit has started its operation and to store the relationship as a relationship in which the upper-limit current value decreases gradually with an increase in the temperature time.

4. The voltage conversion device according to claim 3, wherein the upper-limit current calculating circuit is configured to convert the elapsed time into the temperature time at a greater ratio when a loss of the conversion circuit after the conversion circuit has started its operation has a first magnitude than when the loss has a second magnitude less than the first magnitude.

5. The voltage conversion device according to claim 1, wherein the upper-limit current calculating circuit is configured to set an initial value of the upper-limit current value depending on a state of the conversion circuit at a time of restarting its operation when the conversion circuit having temporarily stopped its operation restarts its operation.

6. The voltage conversion device according to claim 1, further comprising:

- a time detecting unit configured to calculate a post-stop elapsed time after the conversion circuit has stopped its operation; and
- an outside air temperature detecting unit configured to detect an outside air temperature outside the conversion circuit, wherein the upper-limit current calculating circuit is configured to calculate the temperature of the conversion circuit when the conversion circuit having temporarily stopped its operation restarts its operation based on the post-stop elapsed time detected by the time detecting unit, the increase in temperature of the conversion circuit until its operation has been stopped, and the outside air temperature detected by the outside air temperature detecting unit and to calculate the upper-limit current value when the conversion circuit restarts its operation.

7. The voltage conversion device according to claim 1, wherein the input unit is configured to input a voltage output from the power supply device and a current value output from the power supply device as the amount of electric power generated by the power supply device.

8. A vehicle comprising:

a power supply device that is selected from a battery, a fuel cell, and a power generator;

the voltage conversion device according to claim 1; and a load that operates using a voltage converted by the voltage conversion device.

9. A control method for a voltage conversion device including a conversion circuit that steps up a voltage input from a power supply device, the control method comprising:

inputting an amount of electric power generated by the power supply device;

calculating an upper-limit current value using a relationship which is determined based on an increase in temperature of the conversion circuit due to operation of the conversion circuit, the upper-limit current value being an upper-limit value of a current which is able to be output from the conversion circuit;

calculating a lower-limit voltage of the conversion circuit based on the amount of electric power generated by the power supply device and the upper-limit current value; and controlling a voltage on an output side of the conversion circuit by a control unit such that the voltage on the output side of the conversion circuit is higher than the lower-limit voltage.

* * * * *